United States Patent [19]
Cahalan et al.

[11] Patent Number: 5,317,598
[45] Date of Patent: May 31, 1994

[54] PORTABLE TEST RECEIVER FOR REMOTE MONITORING SYSTEM

[75] Inventors: Irving W. Cahalan, Huntington Station; Michael La Clair, Yapank; Paul Seiter, Middle Village; John Weber, Northport, all of N.Y.

[73] Assignee: Hazeltine Corporation, Greenlawn, N.Y.

[21] Appl. No.: 903,648

[22] Filed: Jun. 24, 1992

[51] Int. Cl.⁵ .............................................. H03K 9/04
[52] U.S. Cl. ................................. 375/75; 340/310 A; 375/4
[58] Field of Search .................. 375/84, 75, 81, 56, 375/3.1, 94, 4, 10, 120; 340/310 A, 310 R

[56] References Cited

U.S. PATENT DOCUMENTS 4,583,073  4/1986  Stolowicki .................. 340/310 A
4,908,600  3/1990  Martinez ..................... 340/310 R Primary Examiner—Stephen Chin
Assistant Examiner—Hai H. Phan
Attorney, Agent, or Firm—Edward A. Onders; William B. Ritchie

[57] ABSTRACT

A portable test receiver for field maintenance of a remote sensor monitoring system for underground transformers. The apparatus uses a phase locked loop method to demodulate the DPSK modulation of the remote monitor transmitter. The apparatus is battery operated and easily moved to permit monitoring of spot networks and critical locations for maintenance work. The apparatus features a single software driven display offering good visibility with low current drain. Decoding the transmitter signal is accomplished by using the crystal oscillator circuit of the transmitter is used to generate a reference which is compared to the transmitter signal to detect phase flips. Since the apparatus is battery-powered, there is no AC power to provide "zero" crossing points of the monitored transmitter. Bit timing is provided by taking advantage of the nulls at the 60 cycle "zero" crossings found in the transmitter signal.

5 Claims, 1 Drawing Sheet

PORTABLE TEST RECEIVER FOR REMOTE MONITORING SYSTEM

BACKGROUND OF THE INVENTION

1. Field of the Invention

The invention relates to portable test receivers for on-site functional testing of remote transmitters which monitor network power distribution transformers.

2. Description of the Related Art

The need for a remote monitoring capability of the operating conditions existing at individual transformers in an underground network power distribution system is well known in the art. Ideally, information such as 3 phase load currents on transformers, status of network protectors, oil temperatures of transformers in excess of specified limits, water levels, fuse status, and surrounding environment concerns such as vault access, air temperatures, etc. are required so that critical decisions can be made regarding network switching, problem analysis, peak load analysis, contingency studies, etc.

For example, the Remote Monitoring System, as manufactured by the Hazeltine Corporation, is typical of the current approach to meeting these requirements. The apparatus is a power line carrier system designed specifically to use network distribution feeders as the communication medium between network distribution transformers, located in underground vaults, and the substation. The system consists of a transmitter and sensors installed at the distribution transformer to be monitored and a receiver located at the network substation. The sensors provide input data, such as transformer load currents and network protector position, to the transmitter, which periodically transmits the information, including vault identification, by power line carrier signal over the distribution feeder to the substation receiver. Coupling of the signal to the feeder is accomplished by direct connection to the low voltage side of the network distribution transformer. At the substation, the signal is magnetically detected from the feeder by means of a pick-up coil attached to the feeder cable. Direct electrical connection to the feeder is not required. The substation receiver decodes the signal information and stores the data for presentation on demand. The receiver is microprocessor controlled. In addition to cross referencing data to the actual vault identification, the receiver produces the data in numerous "by exception" formats controlled by command inputs. In a particular situation, such as backfeed location, only the data of interest is presented for analysis. Network protector status and transformer loading prior to and following feeder outages, are available, thereby reducing the need for feeder patrols. Peak period transformer loading data is instantly available for the whole network simultaneously for more accurate planning than was previously possible with manual measurements, which are not concurrent. Monitoring of spot networks, local areas, and crítcal locations for maintenance work can be achieved remotely without the need for field crews on-site to check status.

While such systems have proven to be extremely reliable and produce costs savings only achievable with a real-time monitoring system, the transmitters of the monitoring system require that they be periodically checked to ensure that they are operating properly. It is also important to confirm the message and frequency being transmitted. Ideally, this should be done using a device that can be easily transported to the various field locations to test the functioning of the remote monitoring transmitters.

A portable test receiver designed for the specific purpose of decoding the transmitted signal of a remote transmitter that is monitoring the status of an underground transformer, thereby functioning as a field troubleshooting device, must be small, lightweight, battery powered and relatively inexpensive. Prior art receivers are unable to meet these specifications.

SUMMARY OF THE INVENTION

It is an object of the invention to provide a portable test receiver apparatus that is battery operated and suitable for field maintenance of a particular remote sensor that is monitoring an underground transformer.

It is another object of the invention to provide a portable test receiver apparatus that is small in size so that it may be conveniently moved to various locations.

It is still a further object of the invention to provide a portable test receiver apparatus that has a single liquid crystal display or LCD display, which is software driven, thereby providing good visibility with low power drain.

It is a final object of the invention to provide a portable test receiver apparatus that uses a phase locked loop method to demodulate the differential phase shift keying (DPSK) modulation of the remote monitor transmitter.

The invention is a portable test receiver apparatus for receiving a message signal from a remote monitoring system transmitter having a plurality of transmitting frequencies. The message signal has a plurality of data bit phase flips and corresponding signal nulls which provide information about the status of a monitored transformer. Regeneration means for regenerating the bit timing provided by said transmitter by utilizing the nulls of said message signal is provided. Regeneration means provides a timing signal corresponding to the data bits of said message signal. Phase-locked loop means, having a capture range corresponding to the transmitting frequency range of said transmitter, for converting said message signal, via VCO output, to TTL levels for digital manipulation is provided. Frequency detect means for providing an indication of the frequency of said message signal is provided. Reference means driven by a crystal oscillator, for providing a constant phase and frequency reference for phase flip identification is provided. Means for doubling the frequency of the VCO output of said phase-locked loop means to eliminate 180° phase flips between bits of said message signal is provided. Phase comparison means for identifying phase flips by comparing the signal from said phase-locked loop means to the reference provided by said reference means is also provided. Finally, microprocessor means, connected to said regeneration means and said reference means, and said phase comparison means, for demodulating said message signal using the bit timing from said regeneration means and the output of said comparison means to restore data bit corresponding to said message signal is provided.

DETAILED DESCRIPTION OF THE INVENTION

Figure 1:
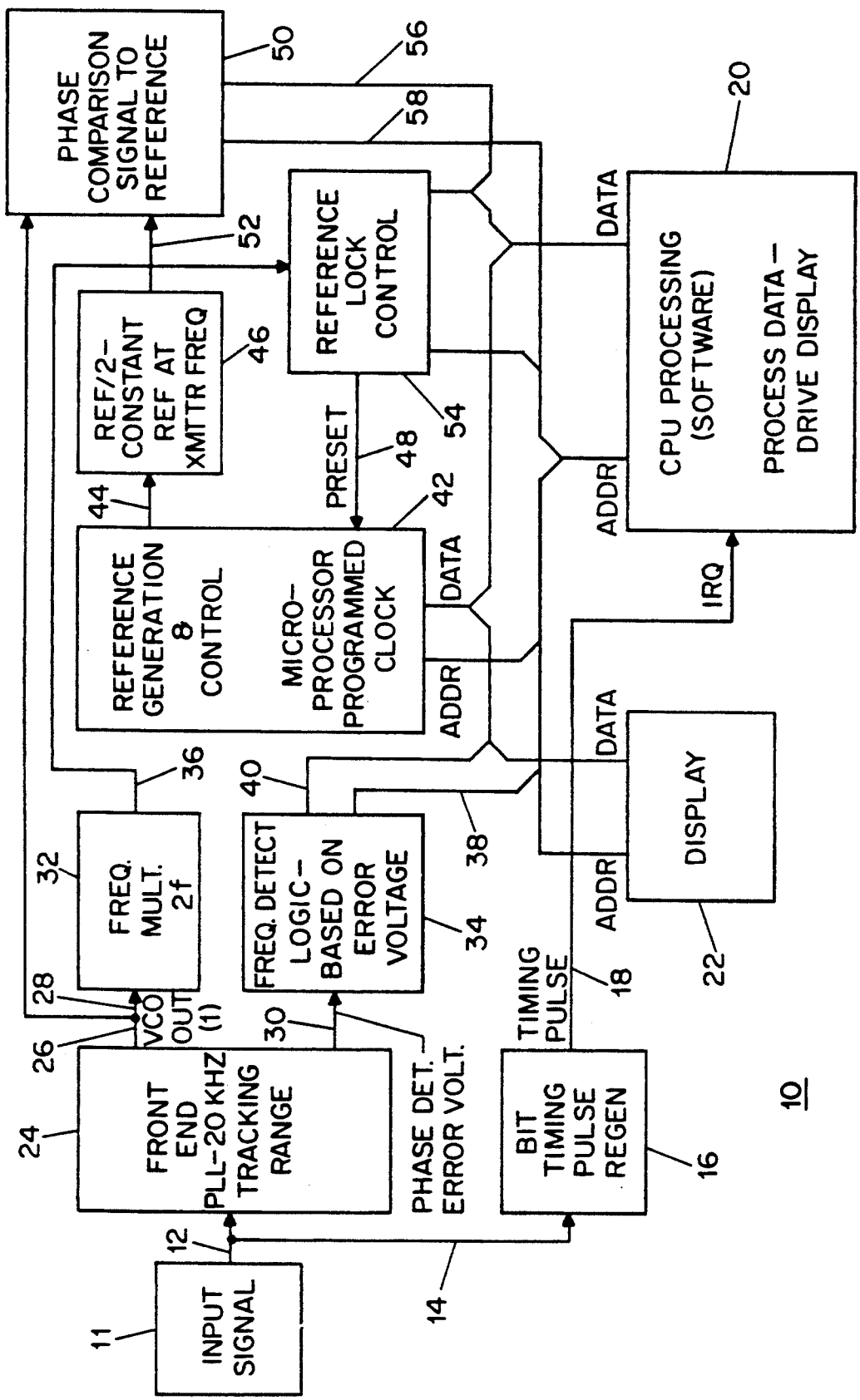
FIG. 1 illustrates a block diagram of the portable test receiver in accordance with the invention.

FIG. 1 illustrates a block diagram of a portable test receiver in accordance with the invention. The transmitter (not shown) of the remote monitoring system provides input signal 11 to receiver 10 by means of a pick-up coil. This signal is supplied to phase locked loop module 24 via line 12.

The tracking range of module 24 is preferably at least 20 kHz, to cover the frequency range of the typical remote monitoring system transmitter. The remote transmitter transmits signal 11 using differential phase shift keying modulation at one of four nominal carrier frequencies. Typically, these frequencies are 45, 50, 55, and 62 kHz. The configuration presented herein, describes the invention in terms of a remote transmitter providing a particular output. However, the invention could be easily modified by those skilled in the art using the teachings contained herein to be suitable for use with transmitters using carrier frequencies having different specifications.

The typical transmitter output signal data rate is 120 bits per second synchronized to the "zero" crossings of the 60 cycle source. Each bit is indicated by a 0° or 180° phase shift of the carrier frequency at the 60 cycle "zero" crossing. A 180° shift indicates a digital "1" and a 0° shift indicates a digital "0".

There are other aspects of the typical remote monitoring system transmitter signal which require special considerations. For example, the loss of transmitter signal at the 60 cycle "zero" crossings due to the lack of current drive as the AC power source goes to zero. The result is a loss of constant signal, making phase flip detection difficult. There is also a loss of bit timing if the portable receiver is to be battery powered, since there is no AC power to provide "zero" crossing. A portable battery-powered unit requires regenerating the 120 cycle bit timing in the absence of a 60 cycle reference. Another property of the typical transmitted signal is that the carrier frequency is highly stable. The integration function of the invention requires that the signal to be demodulated have a highly stable carrier frequency.

Module 24 effectively acts as a filter/amplifier which provides, via line 26, the transmitter signal (voltage controlled oscillator (VCO) output) at transistor-transistor logic (TTL) levels for digital manipulation.

Bit timing is regenerated by module 16, which is provided signal 11 from the transmitter via line 14. Bit timing is necessary to send interrupts to microprocessor 20 via line 18 in order to alert processor 20 that another bit must be processed. The bit timing is restored by taking advantage of the nulls at the 60 cycle "zero" crossings found in the transmitter signal. Module 16 comprises an IF amplifier with a delayed AGC output which acts as a signal level detector. The delayed AGC output changes as the incoming signal 11 goes above and below a certain level, so it can be used to detect signal nulls which correspond to the 60 cycle "zero" crossing. Detection of signal nulls enables the regeneration of bit timing.

In order to decode the DPSK signal 11 from a typical remote monitoring system, it is necessary to detect bit to bit phase flips. Invention 10 takes advantage of the stability of the carrier frequency of the transmitter signal 11 to accomplish this. The crystal oscillator circuit from the transmitter is used to generate a reference which can be compared to the incoming signal 11 to detect phase flips.

A programmable counter in module 42 is used to generate the proper reference frequency based on incoming signal. This is done by monitoring the error voltage level out of the phase comparator of module 24 and provided to module 34 via line 30. Each frequency is represented by a particular level of error voltage. Therefore, using comparators in module 34, the frequency of signal 11 can be detected. The counter in module 42 is then programmed to provide a reference of twice the transmitter frequency.

The actual frequency of transmitter signal 11, provided as output from module 24 at PLL VCO output 28, is doubled in module 32 to eliminate any phase difference from bit. Upon receiving a timing pulse interrupt from module 16 at the beginning of each bit, microprocessor 20 enables reference lock control 54 to send one VCO*2 pulse from module 32 to preset the programmable reference via line 48. This results in an immediate phase lock between the VCO*2 output and the reference in module 42. The reference is then left to run on its own for the remainder of the bit and through the "zero" crossing, where the VCO output is lost. The stability of the crystal oscillator in module 42 maintains the phase and frequency of the reference until the next bit is captured by the PLL. The stability of the transmitter signal insures that the reference phase will remain constant from bit to bit. This constant phase and frequency reference with respect to the transmitter signal would not be possible with an uncorrected crystal oscillator reference. This digital phase-locked loop approach results in a constant phase and frequency reference at twice the transmitter signal throughout the entire 48 bit transmitter message. After division by two in module 46, the reference signal via line 52 is compared in module 50 to the actual VCO output signal provided via line 26. This comparison allows for identification of phase flips from bit to bit, which is the basis for demodulating the DPSK signal from the typical remote monitoring system transmitter.

As each bit is demodulated, it is stored in memory in microprocessor 20 until the 48-bit transmitter message has been restored. The data is then decoded and displayed on a 40 character by 2 line LCD in the form of remote monitoring system "PRNT ID" readout on display 22. The readout displays the transmitter ID number, the load current on all three transformer phases, the five status flags, the frequency of the transmitter signal, and the time elapsed since the last signal was received.

While there have been described what are at present considered to be the preferred embodiments of this invention, it will be obvious to those skilled in the art that various changes and modifications may be made therein without departing from the invention and it is, therefore, aimed to cover all such changes and modifications that falls within the true spirit and scope of the invention.

What is claimed is:

1. A portable test receiver apparatus for receiving a message signal with bit timing from a remote monitoring system transmitter with alternating current zero crossings having a plurality of transmitting frequencies, wherein said message signal has a plurality of data bit phase flips and corresponding signal nulls providing information about the status of a monitored transformer, said portable test receiver apparatus comprising:

- regeneration means for regenerating the bit timing provided by said remote monitoring system transmitter by utilizing the signal nulls of said message signal that correspond to the alternating current zero crossings in said remote monitoring system transmitter to provide a timing signal corresponding to the data bits of said message signal;
- phase-locked loop means, having a capture range corresponding to the transmitting frequency range of said transmitter, for converting said message signal, via voltage controlled oscillator (VCO) output, to transistor-transistor logic (TTL) levels for digital manipulation;
- frequency detecting means for providing an indication of the frequency of said message signal;
- reference means, driven by a crystal oscillator and connected to said message signal, for providing a constant phase and frequency reference signal for phase flip identification;
- frequency doubling means for doubling the frequency of the VCO output of said phase-locked loop means to eliminate 180° phase flips between bits of said message signal;
- phase comparison means for identifying phase flips by comparing the VCO output signal from said phase-locked loop means to the reference signal provided by said reference means;
- microprocessor means, connected to said regeneration means and said reference means, and said phase comparison means, for demodulating said message signal using the bit timing from said regeneration means and the output of said comparison means to a data bit signal corresponding to said message signal.

2. The portable test receiver apparatus of claim 1 wherein said regeneration means comprises an intermediate frequency amplifier with a delayed automatic gain control output to detect nulls of said message signal.

3. The portable test receiver apparatus of claim 1 wherein said microprocessor means controls said reference means, for programming of said reference means according to the output from said frequency detect means.

4. The portable test receiver apparatus of claim 1 wherein said reference means comprises a digital phase-locked loop controlled by said microprocessor means and locked to the frequency of said frequency doubling means.

5. The portable test receiver apparatus of claim 1 further comprising display means for displaying the demodulated transmitter message provided by said microprocessor means and in a format that is indicative of the status of said monitored transformer.

* * * * *